United States Patent
O'Malley et al.

(10) Patent No.: US 11,891,708 B2
(45) Date of Patent: Feb. 6, 2024

(54) GRID LEVEL ENERGY STORAGE SYSTEM AND PROCESS

(71) Applicant: GRIDTHINK INC., Mercer Island, WA (US)

(72) Inventors: James P. O'Malley, Cheyenne, WY (US); Donald Montgomery, Shoreline, WA (US)

(*) Notice: Subject to any disclaimer, the term of this patent is extended or adjusted under 35 U.S.C. 154(b) by 0 days.

(21) Appl. No.: 16/968,962

(22) PCT Filed: Feb. 12, 2019

(86) PCT No.: PCT/US2019/017678
§ 371 (c)(1),
(2) Date: Aug. 11, 2020

(87) PCT Pub. No.: WO2019/157513
PCT Pub. Date: Aug. 15, 2019

(65) Prior Publication Data
US 2020/0399768 A1    Dec. 24, 2020

Related U.S. Application Data

(60) Provisional application No. 62/629,597, filed on Feb. 12, 2018.

(51) Int. Cl.
*C25B 1/02* (2006.01)
*C25B 3/03* (2021.01)
(Continued)

(52) U.S. Cl.
CPC . *C25B 3/29* (2021.01); *C25B 9/17* (2021.01)

(58) Field of Classification Search
CPC .... C25B 1/02; C25B 1/50; C25B 3/03; C25B 3/23; C25B 3/29
(Continued)

(56) References Cited

U.S. PATENT DOCUMENTS 2,770,588 A    11/1956    Okada et al.
4,303,486 A    12/1981    Bard et al.
(Continued)

FOREIGN PATENT DOCUMENTS

CN    106795529 A         5/2017
CN    107075698 A         8/2017
WO    WO-2016008035 A1 *  1/2016    ........... C07C 1/2078

OTHER PUBLICATIONS

Shukla et al., "Anode Phenomena in the Electrolysis of Potassium Acetate. Part III. Formation of Methane," Transactions of the Faraday Society (1932), vol. 28, pp. 457-462. (Year: 1932).*
Sato et al., "Anodic Processes of Acetate Ion in Methanol and in Glacial Acetic Acid at Various Anode Materials," Journal of the Electrochemical Society (Mar. 1, 1968), vol. 115, No. 3, pp. 242-246. (Year: 1968).*
(Continued)

*Primary Examiner* — Edna Wong
(74) *Attorney, Agent, or Firm* — Ewing & Jones, PLLC (57) ABSTRACT

There is disclosed an improved Kolbe reactor system for converting electrical power into a hydrocarbon fuel and hydrogen. More specifically, the present disclosure provides a Kolbe reactor system comprising an open cavity Kolbe reactor and an initial hydrocarbon chemical formulation comprising from about 3N to about 6N C2-C5 carboxylic acid and from about 2M to about 4M alkali C2-C5 carboxylate, wherein the C2-C5 carboxylate and carboxylic acid have the same carbon alkyl length. The Kolbe reactor system can be continuously fed with C2-C5 carboxylic acid to maintain the initial formulation for a continuous process. Electrical energy is stored by converting the carboxylic acid to hydrocarbon fuel and hydrogen, and is recovered by combustion of the hydrocarbon fuel and hydrogen, and or conversion in a hydrogen fuel cell.

6 Claims, 5 Drawing Sheets

(51) Int. Cl.
  *C25B 3/23*  (2021.01)
  *C25B 3/29*  (2021.01)
  *C25B 9/17*  (2021.01)

(58) Field of Classification Search
  USPC .............................. 205/262, 555, 637, 462
  See application file for complete search history.

(56) References Cited

U.S. PATENT DOCUMENTS

| | | | | |
|---|---|---|---|---|
| 5,423,454 A | * | 6/1995 | Lippman | B65D 83/625 |
| | | | | 204/271 |
| 2008/0078671 A1 | * | 4/2008 | Caro | C25B 9/17 |
| | | | | 204/230.2 |
| 2011/0111475 A1 | * | 5/2011 | Kuhry | C12P 7/6409 |
| | | | | 435/166 |
| 2014/0323784 A1 | | 10/2014 | Joshi et al. | |
| 2016/0138861 A1 | * | 5/2016 | Ohart | F25J 1/023 |
| | | | | 62/613 |

OTHER PUBLICATIONS

Peng et al., "Electrochemical Pathways for Electrochemical Oxidation of Acetic Acid," ECS Transactions (Apr. 10, 2018), vol. 85, No. 10, pp. 29-34. (Year: 2018).*

Shukla et al., "Anode Phenomena in the Electrolysis of Potassium Acetate Solutions. Part II. Discharge Potential of the Acetate Ion," Transactions of the Faraday Society (1931), vol. 27, pp. 722-730. (Year: 1931).*

International Search Report issued in Application No. PCT/US2019/017678, dated Jun. 20, 2019; 2 pages.

John Kemp, "New definitions needed for condensate and gas liquids: Kemp" Oct. 10, 2014, 6 pages; Reuters.com.

Yan et al., "A model for the Kolbe reaction of acetate in a parallel-plate reactor", J . Appl. Electrochem. 26: pp. 175-185, 1996.

Office Action issued in TW Application No. 108104670, dated Oct. 18, 2022, 6 pages.

* cited by examiner

GRID LEVEL ENERGY STORAGE SYSTEM AND PROCESS

CROSS REFERENCE TO RELATED APPLICATION

The present patent application claims priority to U.S. Provisional Patent Application 62/629,597 filed 12 Feb. 2018.

TECHNICAL FIELD

The present disclosure provides a process for storing energy by conversion of electric power into hydrocarbon chemicals and hydrogen, comprising: (a) providing an open cavity Kolbe reactor; (b) introducing a formulation of a 2-5 carbon chain primary carboxylic acid, or mixture thereof, at a total acid concentration of from about 3N to about 6N, and an alkali salt of the carboxylic acid or acids; (c) providing electrical power to the Kolbe reactor; and (d) recovering a product stream generated of a C2-8 alkane, $CO_2$ and $H_2$. The present disclosure further provides an improved Kolbe reactor system for converting electrical power into an alkyl hydrocarbon fuel and hydrogen. More specifically, the present disclosure provides a Kolbe reactor system comprising an open cavity Kolbe reactor and an initial chemical formulation comprising from about 3N to about 6N C2-C5 carboxylic acid and from about 2M to about 4M alkali C2-C5 carboxylate, wherein the C2-C5 carboxylate and carboxylic acid have the same carbon alkyl length. The Kolbe reactor system can be continuously fed with a C2-C6 carboxylic acid to maintain the initial formulation for a continuous process.

BACKGROUND

Faraday, in 1834, was the first to report electrochemical production of a gas now known as ethane, during electrolysis of aqueous acetate solutions. This observation was investigated in more detail by Kolbe in 1849. A Kolbe reaction is the anodic oxidation of a carboxylate moiety in an organic acid with subsequent decarboxylation and coupling to yield a dimer of the alkyl function in the carboxylate reactant. An example of a Kolbe reaction is electrolysis of acetate in Formula A:

$$2CH_3COO^- \rightarrow CH_3CH_3 + 2CO_2 + 2e^- \quad (A)$$

where carbon dioxide and ethane evolve as gases from the anode. The corresponding cathode reaction is proton reduction in Formula B:

$$2H^+ + 2e^- \rightarrow H_2 \quad (B)$$

with hydrogen gas evolution from the electrode. The anodic and cathodic-product gases disperse as bubbles in the electrolyte and form a gas-liquid mixture which causes an increased ionic resistance and a higher mass-transfer coefficient at the electrode-solution interface.

Kolbe reactors can be formed as a parallel plate configure with central liquid dispersion and central gas collection.

Yan et al. (*J. Appl. Electrochem.* 26:175-185, 1996) provided a "mathematical model . . . for the study of the Kolbe oxidative dimerization of acetate to ethane and carbon dioxide in a parallel-plate reactor operating at a fixed cell potential, with hydrogen evolution being the cathode reaction." Yan et al. used an open plate geometry with a two electrode (anode and cathode) cell in which current is controlled. However, the Yan et al. model predicted a much higher voltage than would be required (in their modeling exercise) because Yan et al. calculated an acetic acid concentration of about 1N.

Improvement of modern electrical gird infrastructure focuses on decarbonized, distributed power which relies increasingly on distributed energy resources (DER). Accelerated deployment of renewable power generation such as wind and solar, has accelerated the need for large-scale, grid-level electrical energy storage even for non-renewables. Several types of grid-level energy storage systems have been designed to address this need. These include battery storage (e.g., Lithium ion, lead acid, redox, nickel iron), pumped hydro, compressed air, chemical systems, and flywheel systems. However, many of these energy storage systems suffer from low round trip electrical energy efficiency. For example, battery storage typically operates between 50% and 90% round trip efficiency and pumped hydro about 77% efficiency.

Therefore, there is a need in the art for a grid-level energy storage system that achieves improved round trip efficiency, especially at large scales. The present disclosure provides a scalable, superior energy storage system that achieves high round trip electrical energy efficiency.

SUMMARY

The present disclosure provides a process for storing energy by converting electric power into hydrocarbon chemicals and hydrogen, comprising: (a) providing an open cavity Kolbe reactor; (b) introducing a formulation of a 2-5 carbon chain primary carboxylic acid, or mixture thereof, at a total acid concentration of from about 3N to about 6N, and an alkali salt of the carboxylic acid; (c) providing electrical power to the Kolbe reactor to operate it; and (d) recovering a product stream generated of a C2-8 alkane, $CO_2$; and $H_2$ or (e) of cryogenic cooling or a combination of (d) and (e).

Preferably, current density of the Kolbe reactor is from about 10 $mA/cm^2$ to greater than 300 $mA/cm^2$. More preferably, the current density is from about 20 $mA/cm^2$ to about 140 $mA/cm^2$. Low current operation is below 60 $mA/cm^2$, provides the highest round-trip electrical energy efficiencies (see FIG. 4), but will necessitate more surface area for a system of identical energy scale and will thus increase the capital cost. From these considerations, the most preferred range of current densities is from 60 $mA/cm^2$ to 100 $mA/cm^2$.

The present disclosure further provides an improved Kolbe reactor system for converting electrical power into an alkyl hydrocarbon fuel and hydrogen. More specifically, the present disclosure provides a Kolbe reactor system comprising an open cavity Kolbe reactor and an initial chemical formulation comprising from about 3N to about 6N C2-C5 carboxylic acid and from about 2M to about 4M alkali C2-C5 carboxylate, wherein the C2-C5 carboxylate and carboxylic acid have the same carbon alkyl length. The Kolbe reactor system can be continuously fed with a C2-C5 carboxylic acid to maintain the initial formulation for a continuous process.

The present disclosure provides a Kolbe system that provides a commercially advantageous lower voltage needed to form ethane from acetic acid because a much higher concentration of acetic acid was used than Yan et al. and the initial formulation provided potassium ions (instead of sodium in Yan et al.) with potassium acetate to prime the reaction while maintaining potassium in the system. More specifically, the present disclosure provides a Kolbe reactor system comprising an open cavity Kolbe reactor and a chemical formulation comprising an initial formulation of from about 3N to about 6N of a C2-C5 carboxylic acid and from about 2M to about 4M of an alkali C2-C5 carboxylate, wherein the C2-C5 carboxylate and carboxylic acid have the same carbon alkyl length. The Kolbe reactor system further comprises a continuously fed formulation comprising from about 3N to about 6N C2-C5 carboxylic acid, whereby addition of a C2-C5 carboxylic acid maintains the initial formulation for a continuous process. Preferably, the C2-C5 carboxylic acid is acetic acid and the alkali C2-C5 carboxylate is potassium acetate. More preferably, the concentration of acetic acid in the initial formulation is approximately 6N.

The present disclosure further provides a method for storing energy by conversion of electric power into hydrocarbon chemicals and hydrogen, comprising:
a. providing an open cavity Kolbe reactor;
b. introducing a formulation of a 2-5 carbon chain primary carboxylic acid, or a mixture thereof, at a concentration of from about 3N to about 6N, and an alkali salt of the carboxylic acid;
c. providing electrical power to the Kolbe reactor; and
d. recovering a product stream generated of a C2-C8 alkane, $CO_2$ and $H_2$.

Preferably, the C2-C5 carboxylic acid is acetic acid and the C2-C8 alkane is ethane.
Preferably, the method further comprises recovering the C2-C8 alkane by a liquefaction comprising compressing the gas effluent.

The present disclosure further provides a method for harvesting electrical power from a renewable energy farm, e.g. wind or solar, by conversion of electric power into hydrocarbon chemicals and hydrogen, comprising:
a. providing an open cavity Kolbe reactor;
b. introducing a formulation of a 2-5 carbon chain primary carboxylic acid, or a mixture thereof, at a total acid concentration of from about 3N to about 6N, and an alkali salt of the carboxylic acid;
c. providing electrical power to the Kolbe reactor; and
d. recovering a product stream generated of a C2-C8 alkane, $CO_2$ and $H_2$.

Preferably, the C2-C5 carboxylic acid is acetic acid, the alkali carboxylate salt is potassium acetate, and the C2-C8 alkane is ethane. Preferably, the method further comprises recovering the C2-C8 alkane by a liquefaction process comprising compressing or freezing the gas effluent.

DETAILED DESCRIPTION

Figure 1:
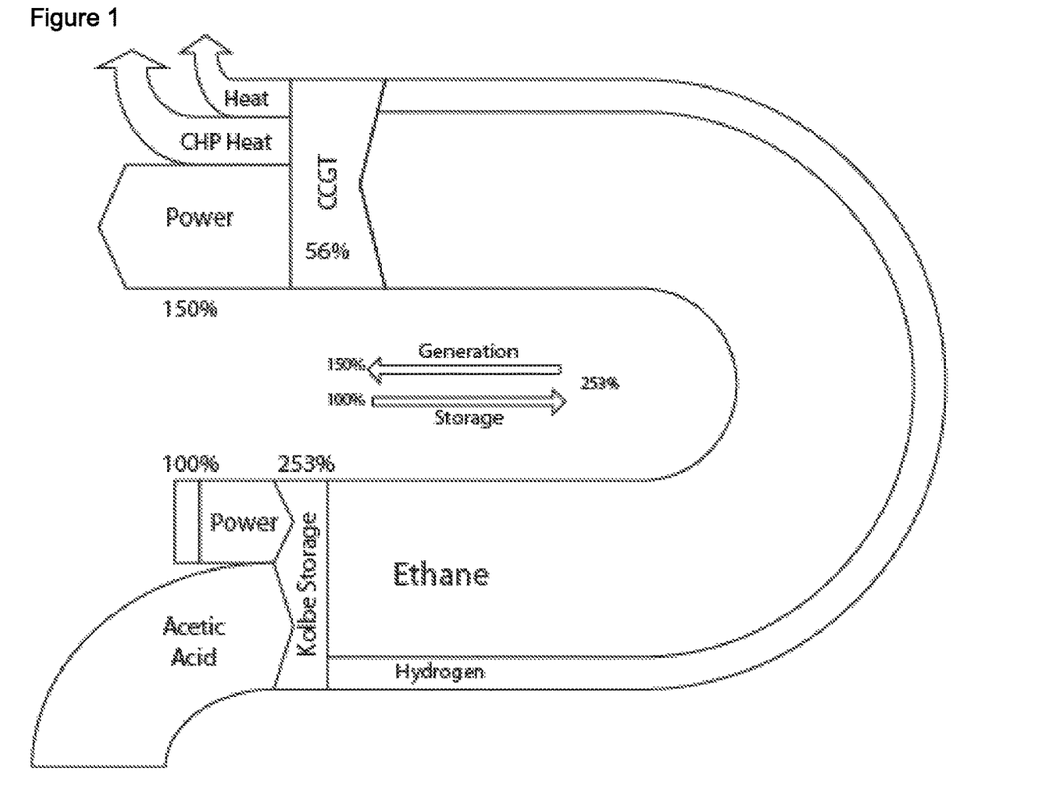
FIG. 1 shows an energy flow schematic of the disclosed Kolbe energy storage system when using acetic acid.

There are categorically different types of electrical energy storage, including mechanical, chemical, traditional battery, molten salt and metal air batteries, flow batteries, and electromagnetic systems. Each such system cannot produce more than 100% theoretical round trip efficiency. Moreover, only pumped hydro (pumping water back up over a dam/barrier) has been deployed at a grid-level scale. By comparison, the presently disclosed energy storage process and Kolbe reactor system can achieve up to 160% round trip electrical energy efficiency in view of how the energy stored is utilized and adding energy from the carboxylic acid used, preferably acetic acid. This concept is illustrated in FIG. 1.

Any electrical energy storage system has a round trip electrical energy efficiency $\epsilon_{RT}$ defined as $$\epsilon_{RT} = \frac{\epsilon_{out}}{\epsilon_{in}} \quad (1)$$

where $\epsilon_{out}$ is the electrical energy output from the storage system and $\epsilon_{in}$ is the electrical energy initially input into the storage system. Subihuddin et al., *Energies* 8:172-216, 2015 provides an explanation and comparative data (summarized in Table 1) of theoretical round trip electrical energy efficiency of existing energy storage systems.

Briefly, mechanical storage takes the form of either potential energy or kinetic energy storage. Pumped hydroelectric, compressed air and flywheel systems are the best known. Pumped hydroelectric systems (PHS) are the dominant form of energy storage in the world today and are the only currently feasible and commercially proven means of storing large quantities (GWh scale and larger) of electrical energy for relatively long durations. Largest installed capacities are in the USA (21.8 GW) and Japan (24.6 GW) followed by much smaller installations by European countries such as Spain (5.3 MW). Compressed air energy storage (CAES) is a viable contender for large scale storage after PHS. It can be used for long or short duration storage at many scales. CAES systems utilize air that undergoes three main processing steps: compression, storage and expansion.

Flywheel energy storage (FES) systems store energy in a rotating mass. Devices are composed of five main subsystems: flywheel, bearing, electrical machine, power converter and containment chamber. In general, FES systems have shown extremely high efficiencies for short duration storage (stored for less than 1 hour) and have virtually unlimited temperature independent deep discharge capabilities. FES systems have low environmental impacts, high specific power and power densities, good specific energy and energy densities, fast response times, very low capacity degradation, long life, high scalability, and the need for very little periodic maintenance. Unfortunately, FES systems suffer from two main short comings: high self-discharge rates and safety.

The most known and widely used forms of chemical storage are secondary batteries. These include: lead acid (Pb-Acid), lithium ion (Li-Ion), nickel metal hydride (NiMH), nickel cadmium (NiCd), nickel iron (NiFe) and nickel zinc (NiZn) devices. These batteries consist of three main components: The positive (cathode) and negative (anode) electrodes, the electrolyte and the separator. Grid scale secondary battery systems not widely deployed. Performance of traditional batteries is strongly linked to the material composition of the electrodes, with cycle life and lifespan being determined by the nature of the interface between electrolyte and electrode as well as electrode stability. As a result, most chemistries are highly temperature sensitive and will experience a drop in capacity based on both environmental conditions and charge-discharge regimes. Likewise, rechargeable (secondary battery) chemistries tend to see a drop in performance when compared to primary batteries. This is usually a result of limited material availability for these configurations. Charge retention is usually measured in the range of years for primary batteries but drops to months or less in secondary battery systems. Many systems will experience pressure build-up and require venting or are serious safety risk due to explosion or fire.

TABLE 1

Round trip electrical energy efficiencies for known energy storage systems

| Energy Storage System | Abbreviation | Efficiency |
|---|---|---|
| Mechanical Systems | | |
| Pumped-Hydro Storage | PHS | 76.6% |
| Compressed Air | CAES | 68.3% |
| Flywheel | FES | 89.4% |
| Chemical Storage System | | |
| Water electrolysis | | 40.0% |
| Traditional Batteries | | |
| Lead Acid | Pb-Acid | 76.9% |
| Lithium ion | Li-ion | 89.8% |
| Nickel Metal Hydride | NiMH | 66.5% |
| Nickel Cadmium | NiCd | 45.3% |
| Nickel Iron | NiFe | 43.1% |
| Nickel Zinc | NiZn | 69.6% |
| Molten Salt | | |
| Sodium Sulfide | NaS | 81.5% |
| Sodium Nickel Chloride | NaNiCl | 72.1% |
| Metal Air Batteries | | |
| Zinc Air | Zn-Air | 44.3% |
| Iron Air | Fe-Air | 66.5% |
| Flow Batteries | | |
| Vanadium Redox | VBR | 77.0% |
| Zinc Bromide | ZBB | 73.3% |
| Polysulfide Bromide | PBB | 71.5% |
| Electromagnetic Storage Systems | | |
| Superconducting Magnet | SMES | 92.5% |
| Supercapacitor (Electric Double Layer Capacitor) | ELDC | 91.3% |

The disclosed improved Kolbe reactor system for storing and harvesting electric power provides a system for achieving electrical energy storage by producing hydrocarbon chemical fuels and hydrogen from a carboxylic acid. The disclosed improved Kolbe reactor may utilize carboxylic acids produced from renewable carbon sources, in order to generate renewable hydrocarbon fuels. The hydrocarbon fuels produced by the disclosed improved Kolbe reactor can be utilized to power transportation vehicles or to generate electrical power using conventional steam turbine generators, combined cycle turbine generators, combustion engines/gensets, or fuel cells.

The disclosed improved Kolbe reactor produces a surprising result in that, the ratio of the energy returned via generation utilizing the chemicals versus the electrical energy stored as chemicals may be greater than 1. For example, if a wind farm generating electrical energy utilizes the energy storage mechanism described by the present invention, the electrical energy returned may be greater than 100% versus the wind energy initially stored (see FIG. 1).

Figure 4:
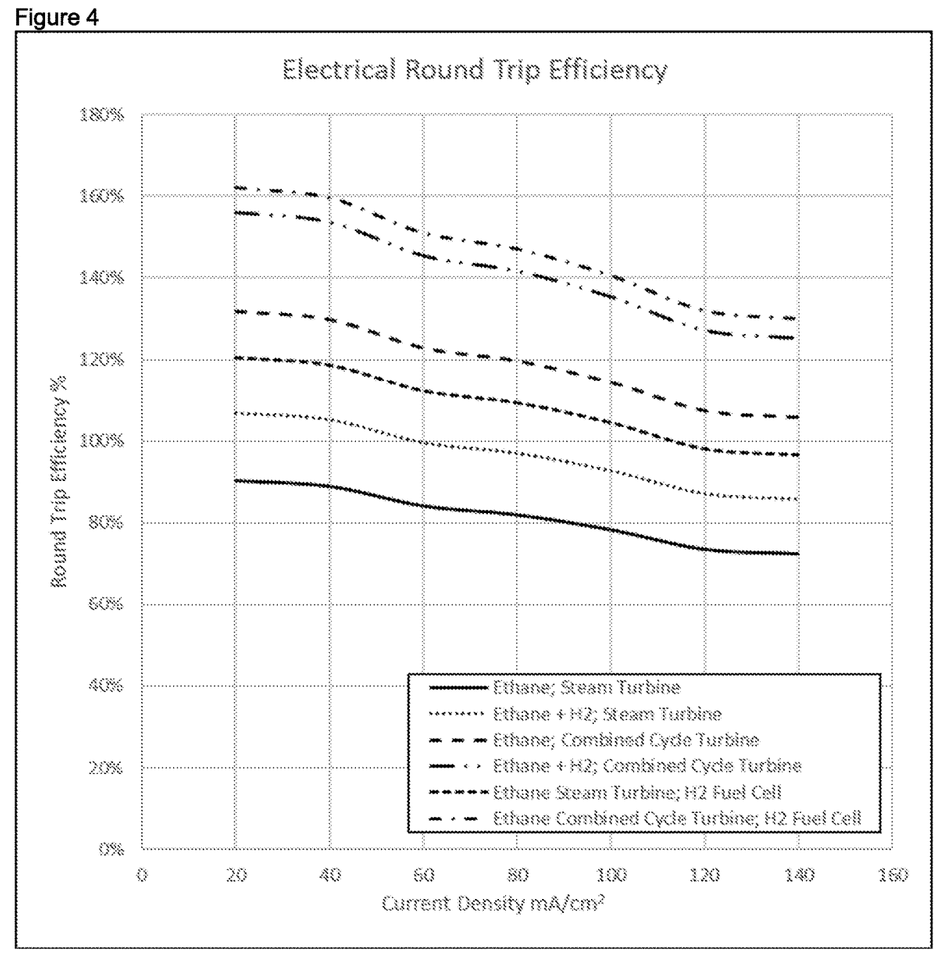
FIG. 4 shows calculated round trip electrical efficiency using Equation 6 and experimental data from Examples 1 and 2. Turbine efficiency (% HHV) was assumed to be 0.3838 for steam turbine and 0.5604 for a state-of-the-art combined cycle turbine. Hydrogen fuel cell efficiency was assumed to be 0.70.

The round trip electrical energy efficiency provided by the present disclosure will vary based on the electrical generation means used to extract the stored energy. FIG. 4 shows the electrical energy round trip efficiencies of the disclosed process, in the specific case of the Kolbe electrolysis of acetic acid. The round trip efficiencies plotted in FIG. 4 were calculated using Equation 6 using experimentally obtained data collected in Examples 1 and 2. The hydrocarbon fuel may be separated from the hydrogen and combusted in a steam turbine to form electrical energy. The hydrocarbon may also be combusted in a combined cycle turbine, or combustion engine/genset. Further, the hydrogen may be co-combusted with the hydrocarbon in a steam turbine. Further still, the mixed hydrocarbon/hydrogen mixture may be combusted in a combined cycle turbine or combustion engine/genset. Additionally, the hydrogen may be converted to electrical energy in a fuel cell, and the hydrocarbon can be combusted in a steam turbine or combined cycle turbine.

To employ Kolbe electrolysis for energy storage, electrical energy to be stored is used to convert the carboxylic acid to the corresponding hydrocarbon. In the case of the Kolbe electrolysis of acetic acid to ethane, the electrical energy is used to accomplish the following reaction:

$$2H_3CCOOH \xrightarrow{2e^-} H_3CCH_3 + 2CO_2 + H_2 \quad (2)$$

The energy is "stored" as the chemical combustion energy of the hydrocarbon. By burning the hydrocarbon in a turbine or combustion engine/genset arrangement, the chemical energy is reconverted back to electrical energy and can be restored to the grid or used. If a turbine is used, the combustion chemical energy is reconverted with an efficiency of $\epsilon_T$.

$$H_3CCH_3 + 7O_2 \rightarrow 4CO_2 + 7H_2O \quad \Delta H_c° 1560 \text{ kJ/mol (HHV)} \quad (3)$$

For a Kolbe system operating at an average cell voltage $V_K$ and current $I_K$ over an arbitrary time period t, the electrical energy input is given by

$$\epsilon_{in} = V_K I_K t \quad (4)$$

The electrical output of the storage system depends on the turbine efficiency $\epsilon_T$, the combustion energy of the ethane $\Delta H_c°$(Joules), and the moles of ethane produced by Kolbe electrolysis, $\eta$ and is given by:

$$\epsilon_{out} = \epsilon_T \eta \Delta H_c° = \epsilon_T \Delta H_c° \frac{\epsilon_K I_k t}{2\mathcal{F}} \quad (5)$$

where $\epsilon_K$ is the faradaic efficiency of the Kolbe reaction, i.e. the fraction of total electrons passed through the Kolbe cell which are attributable to the decarboxylative process, and $\mathcal{F}$ is Faraday's constant 96,485 Coulombs/mole electrons. The stoichiometric factor of 2 has units of moles electrons/moles ethane. Substituting $\epsilon_{in}$ and $\epsilon_{out}$ into $\epsilon_{RT}$ yields the following expression for the round-trip electrical efficiency.

$$\epsilon_{RT} = \frac{\epsilon_T \epsilon_K \Delta H_c°}{2V_K \mathcal{F}} \quad (6)$$

In referencing Equation 6, it becomes apparent that in order to maximize the round-trip electrical energy efficiency of the present invention, it is advantageous to operate the Kolbe system at the highest possible faradaic efficiency $\epsilon_K$ and lowest possible average cell voltage $V_K$. Hence, preferred embodiments are those which will maximize faradaic efficiency while minimizing average cell voltage. Kolbe processes typically display increasing faradaic efficiency with current density. However, increased current density will also result in an increased average cell voltage $V_K$. The most preferred embodiments are thus a compromise between keeping the current density high enough to maximize $\epsilon_K$ yet keeping current density low enough to minimized average cell voltage $V_K$.

One feature of the disclosure is an open cavity Kolbe system. Such a system comprises a two-electrode cell, or stack of such cells, employed in the Kolbe electrolysis of a C2-C5 carboxylic acid. By using an open cavity configuration, the electrochemical cell resistance is reduced and thus improves the performance of the cell when compared to non-open (separated) configurations. This is largely due to a reduced $V_K$ term in Equation 6.

A Kolbe system may be operated at current densities from about 10 mA/cm$^2$ to greater than 300 mA/cm$^2$, but for the considerations highlighted by Equation 6, is preferably operated in the range of 20 mA/cm$^2$ to 140 mA/cm$^2$. Low current operation, below 60 mA/cm$^2$, provides the highest round-trip electrical energy efficiencies (see FIG. 4), but will necessitate more surface are for a system of identical energy scale and will thus increase the capital cost. From these considerations, the most preferred range of current densities is from 60 mA/cm$^2$ to 100 mA/cm$^2$.

The Kolbe system utilizes a liquid medium containing at least one carboxylic acid and at least one salt of the at least one carboxylic acid. The counter ion of the salt may be an alkali metal ion, such as the potassium cation, or other any other ion that will form a salt. The at least one carboxylic acid is used by the invention for conversion into a hydrocarbon by the electrochemical Kolbe reaction. The concentrations of the at least one carboxylic acid or mixture of carboxylic acids may be from about 1N-6N, and the concentration of the at least one carboxylate salt may be from 1-3M. In a preferred embodiment, electrolyte concentrations of about 3M potassium acetate and 6N acetic acid are used.

The disclosed process enables the storage of energy as chemical products. Storage of energy in chemicals has much higher mass and/or volume storage density than energy stored by any other means. In the case where the chemical is a gas, the stored energy may be transported by any conventional means, including pipelines. Transport of the stored energy by a pipeline enables distribution of the stored energy using existing pipeline infrastructure, offering an economic advantage by reducing the capital costs required for an energy storage facility that utilizes the invention.

The disclosed process decouples an energy storage process from an energy recovery process. More specifically, energy storage in chemicals occurs whenever and wherever electric power is available. The chemicals produced by the disclosed process can be used as a fuel for electrical energy generation, heat, or transportation wherever and wherever either is needed. This is an advantage over many energy storage means, such as batteries, where the storage of energy must occur at a separate time from the recovery of the energy. Also, recovery of the stored energy must occur at the same physical location.

The disclosed process enables the use of greater than unity round trip efficiency to amplify the amount of energy produced by renewable and other means. These energy storing chemical products can be transported by conventional means, such as pipelines, ships, trains and tanker trucks, to locations that allow recovery of the energy in a manner that allows facile integration into existing electric power distribution networks.

Example 1

This example provides a description of a prototype open cavity Kolbe reactor that was used to measure the improved Kolbe system described herein. A 2-electrode cell for Kolbe electrolysis of acetate was constructed. No separator was used between the electrodes. The Kolbe cell included a gas-tight, sealed cast acrylic housing, two solid platinum plate electrodes 0.5 mm thickness and 2.65 cm$^2$ geometric surface area, and a gas-tight, sealed lid containing a gas outlet fitting. The platinum electrodes were in a parallel plate orientation with an electrode spacing of 7 mm, and were fully submerged in electrolyte solution. The total approximate volume of the electrolyte solution was about 25 mL. Convection in the electrolyte was accomplished by the buoyant action of gases egesting from the Kolbe cell. Electrical connections were made through silicone-sealed brass screw terminals. The Kolbe apparatus was connected to a gas sampling system via stainless steel tube connections. Electrical parameters were controlled and measured by a laboratory potentiostat (VMP-3, Bio-Logic SAS France).

Figure 2:
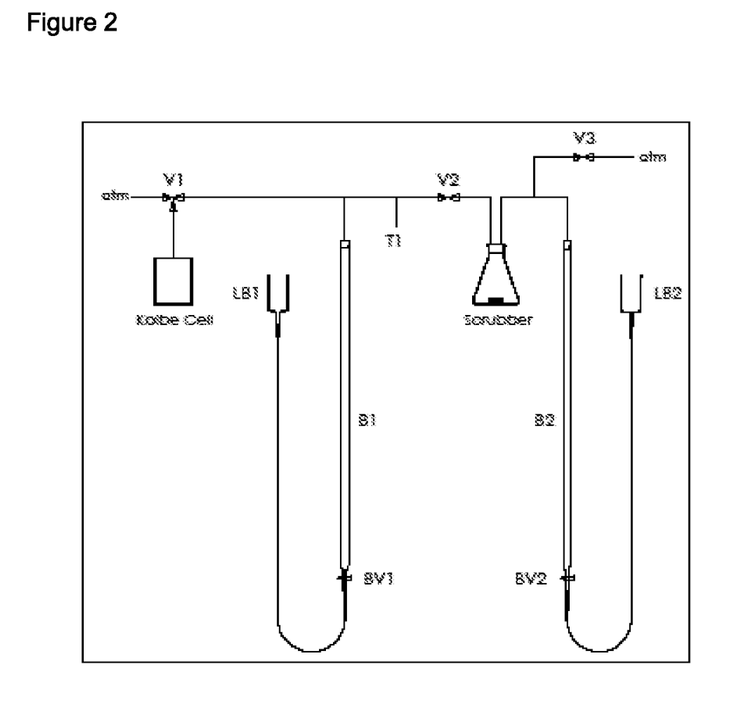
FIG. 2 shows an experimental Kolbe gas sampling system schematic.

The sample collection and measurement system is described with reference to FIG. 2. The sampling system includes a 100 mL buret B1 to capture a gas sample of known volume, and a $CO_2$ scrubbing arrangement. Initially, a small constant current was applied to the Kolbe cell for a time sufficient to saturate the electrolyte with Kolbe gases produced by electrolysis. For the 2.65 cm$^2$ device, 53 mA for 30 minutes was found to be a sufficient time for saturation. Prior to sampling, three-way-valve V1 was positioned to vent Kolbe gases to atmosphere at ambient pressure. Also prior to sampling, the liquid level of saturated NaCl solution in buret B1 was set to 0.0 mL and that in buret B2 was set to 0.0 mL by using leveling balls LB1 and LB2 respectively. Prior to sample collection, valves V2 and V3 were both opened to set the headspace pressure in the sampling system to the ambient pressure. A few minutes prior to sampling, the current was changed quickly from the pre-saturation current of 53 mA to the desired test current; the sampling procedure was used to measure decarboxylative efficiency at each of several currents.

Immediately prior to sampling, valves V2 and V3 were closed to isolate the sampling system from the atmosphere. At the commencement of sampling, three-way-valve V1 was actuated to direct Kolbe gases to the sampling system and a stopwatch was started simultaneously. To ensure constant ambient pressure during sampling, levelling ball LB1 was manually brought down concomitant with the falling liquid level inside the sampling buret B1. After a sufficient volume of gaseous sample had been collected (typically about 90 mL), three-way-valve V1 was actuated and the stopwatch was simultaneously stopped. The total volume (at ambient pressure) of Kolbe gas collected was read from the buret B1 by balancing a manometer formed by the levelling ball LB1 and buret B1. At the time of volume reading, the gas sample temperature was determined from thermocouple T1. From these data, and a co-located absolute mercury barometer, the total charge passed and the total moles of gas could be calculated.

To measure faradaic efficiency for a decarboxylative Kolbe process, it was necessary to determine the $CO_2$ content of the sampled gas. This was accomplished by measuring the volume change in the sampled gas after scrubbing with a moderately concentrated KOH solution, contained and agitated in the $CO_2$ scrubber (see FIG. 2). The gas sample was repeatedly passed over the scrubber by manually actuating levelling balls LB1 and LB2 in tandem to move the gas sample from B1 to B2, and vice-versa. Volume change was measured by first restoring the liquid level in buret B2 back to 0.0 mL by adjusting LB2, and then closing buret valve BV2. The volume was then read by balancing the manometer formed by buret B1 and its levelling ball LB1. Volume change ($CO_2$ scrubbed) was calculated as the difference between the initial gas volume, and the final scrubbed volume. Scrubbing was concluded when repeated scrub cycling no longer resulted in a volume change (typically 10-13 scrub cycles). After sampling, the gas was vented to atmosphere through valves V2 and V3, and typically was flared.

Example 2

Figure 3:
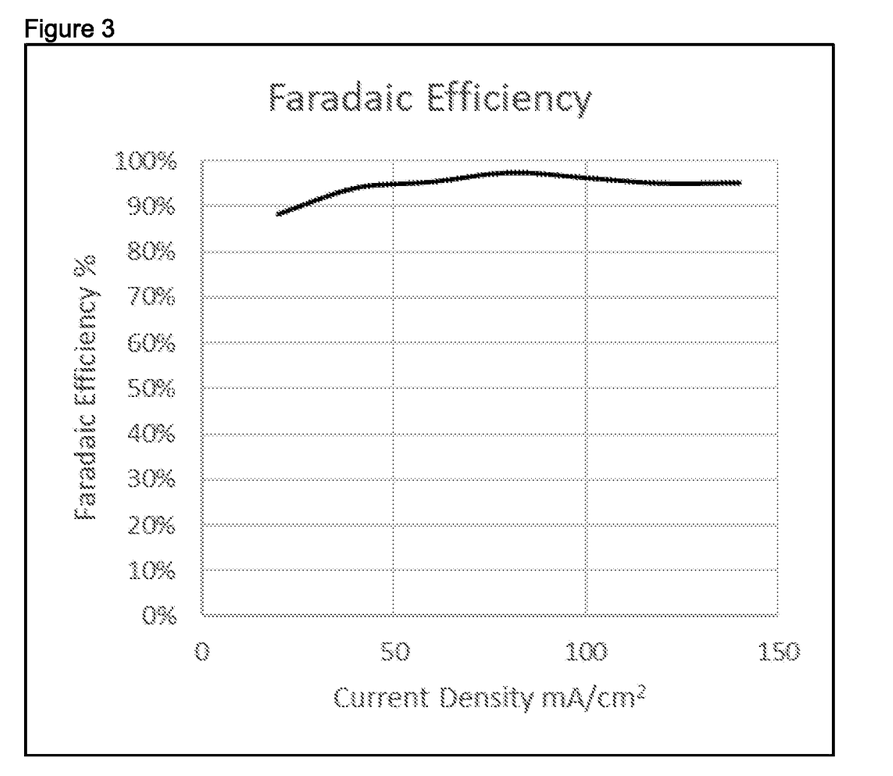
FIG. 3 shows Faradaic efficiency versus current density for the decarboxylative Kolbe process in Example 2.

The 2.65 cm² cell with 2 solid platinum electrodes described in Example 1 was employed to electrolyze several electrolyte solutions at ambient temperatures (typically about 20° C.) and high-altitude ambient pressure (typically about 800 mbar). Preliminary results indicated that a particularly favorable electrolyte was 3M potassium acetate and 6N acetic acid in water. A solution was prepared from ACS reagents and 23 mL were loaded into the Kolbe cell prior to electrolysis. The gas sampling system described in Example 1 was used to analyze the Kolbe products and calculate the Faradaic efficiency versus current density. The results are shown in Table 1, and plotted in FIG. 3. Table 1 shows Kolbe electrolysis data for a 3M potassium acetate/6N acetic acid mixture in water. (a) Faradaic efficiency computed assuming 1 mole e⁻ per 1 mole $CO_2$(g).

in the product stream, and depends on the efficiency of the generation method used (turbine/genset, fuel cell, etc.). Round trip electrical energy efficiencies are shown in FIG. 4 for combined cycle and standard turbines, for cases of ethane combustion only, combined ethane and hydrogen combustion, and for cases wherein hydrogen is converted to electrical energy via a hydrogen fuel cell.

Example 3

The Kolbe reactor of Example 1 was used to electrolyze an initial formulation of 3M potassium acetate and 6N acetic acid in water at ambient atmospheric conditions, typically about 20° C. and 800 mbar, under constant current conditions. The gas outlet of the Kolbe reactor was connected to a gas chromatograph for monitoring and quantification of the gaseous products. Carbon dioxide was quantified via calibration curve using external standards mixtures, which were prepared using purified analyte gas ($CO_2$>99.5%, Norco USA) using a static volumetric method. A buret and manometer arrangement was used to measure the total gaseous flowrate of the Kolbe reactor. The laboratory temperature and pressure were also measured regularly to enable conversion of the measured volumetric flowrates into molar flowrates.

Flowrates and compositional data were collected at steady state condition for 20 mA/cm² and 140 mA/cm², after a pre-saturation period of about 1 hour at 53 mA total current. During electrolysis, the constant current was controlled by potentiostat, the bulk gaseous flowrate was measured using a buret/manometer arrangement, as in Example 1, and the $CO_2$ concentration was determined using a gas chromatograph (Shimadzu 8A) equipped with a TCD detector. A sample loop was used to precisely control the sample volume. Samples of 1000 μL were separated on a Shincarbon ST column (⅛"×2 m, Restek) in an isothermal oven

TABLE 1

| Measurements | | | | | | | Calculated | | |
| --- | --- | --- | --- | --- | --- | --- | --- | --- | --- |
| Current Density (mA/cm²) | Sample Collection Time (min:sec) | Average Voltage | Gas Temp (° F.) | Barometer (mbar) | Sample Volume (mL) | $CO_2$ Scrubbed (mL) | Charge Passed (mAh) | $\eta_{CO2}$ (milli mols) | Faradaic efficiency$^a$ (%) |
| 20 | 48:00 | 3.030 | 74.6 | 802.8 | 90.70 | 42.90 | 42.40 | 1.396 | 88.22 |
| 40 | 23:59 | 3.280 | 74.1 | 802.1 | 92.20 | 45.70 | 42.37 | 1.487 | 94.04 |
| 60 | 16:00 | 3.516 | 73.6 | 802.1 | 93.10 | 46.30 | 42.40 | 1.478 | 95.39 |
| 80 | 11:42 | 3.688 | 73.7 | 803.5 | 90.90 | 46.10 | 41.34 | 1.504 | 97.48 |
| 100 | 9:37 | 3.814 | 69.5 | 805.0 | 92.15 | 46.35 | 42.47 | 1.527 | 96.33 |
| 120 | 8:00 | 4.008 | 73.2 | 810.8 | 93.05 | 45.65 | 42.40 | 1.504 | 95.06 |
| 140 | 6:53 | 4.077 | 73.8 | 810.8 | 93.65 | 45.95 | 42.56 | 1.512 | 95.21 |

Figure 5:
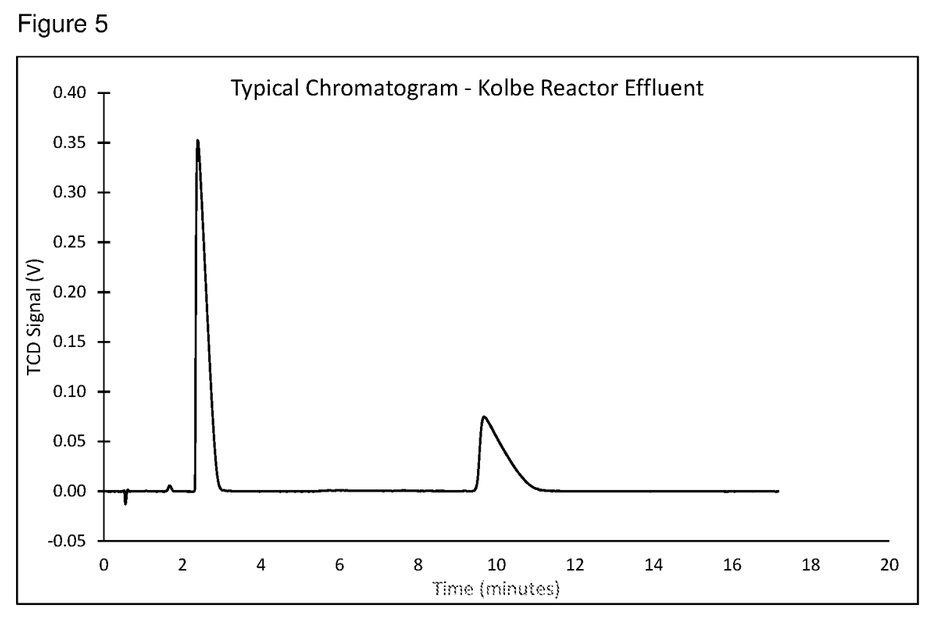
FIG. 5 shows a typical chromatogram of Kolbe reactor effluent. Chromatography conditions were oven temp: isothermal 140° C., detector temp 180° C., He carrier gas constant pressure (flowrate about 21 mL ambient/min), Detector: TCD, Sample size: 1000 μL. Peaks are identified as: Hydrogen at 0.5 mins, $CH_4$ at 1.7 mins, $CO_2$ at 2.4 mins, Ethane at 9.7 m mins.)

Using the measured operating cell voltages and faradaic efficiencies, round trip electrical energy efficiency for an energy storage system based on Kolbe electrolysis of acetate can be calculated according to equation 6. The calculation is based on the stoichiometry of the Kolbe reaction, which gives 1 mole ethane and 1 mole of $H_2$ for every 2 moles $CO_2$ with a column temperature of 140° C. and detector temp of 180° C. A typical chromatogram is shown in FIG. 5.

By combining the bulk flow rate data with the CO2 concentrations determined by gas chromatography, it is possible to calculate the faradaic efficiency for decarboxylation. Results are given in the table below.

| Current Density (mA/cm²) | Current (mA) | Bulk Flowrate (μmol/sec) | CO2 Conc. mol % | CO2 rate (μmol/sec) | Theoretical CO2 rate (μmol/sec) | Faradaic Efficiency (Decarboxylative) |
| --- | --- | --- | --- | --- | --- | --- |
| 20 | 53 | 1.0667 | 49.61% | 0.5292 | 0.5493 | 96.34% |
| 140 | 371 | 7.5537 | 48.23% | 3.6434 | 3.8451 | 94.75% |

We claim:

1. A process for storing energy by converting electric power into hydrocarbon chemicals and hydrogen, comprising:
   a. providing an open cavity Kolbe reactor;
   b. introducing into the open cavity Kolbe reactor a formulation of a 2-5 carbon chain primary carboxylic acid, or mixture thereof, at a total acid concentration of from about 3N to about 6N, and an alkali salt of the carboxylic acid;
   c. providing electrical power to the Kolbe reactor having a current density of between 60 mA/cm$^2$ to 100 mA/cm$^2$; and
   d. recovering a product stream generated of a C2-8 alkane, $CO_2$ and $H_2$.

2. The process of claim 1, wherein the 2-5 carbon chain primary carboxylic acid is acetic acid and the C2-8 alkane is ethane.

3. The process of claim 1, further comprising recovering the C2-8 alkane by a liquefaction process comprising compressing or cooling a gas effluent.

4. A process for harvesting electrical power from a renewable energy source by conversion of electric power into hydrocarbon chemicals and hydrogen, comprising:
   a. providing an open cavity Kolbe reactor;
   b. introducing into the open cavity Kolbe reactor a formulation of a 2-5 carbon chain primary carboxylic acid, or mixture thereof, at a total acid concentration of from about 3N to about 6N, and a potassium salt of the 2-5 carbon chain primary carboxylic acid;
   c. providing electrical power to the Kolbe reactor having a current density of between 60 mA/cm$^2$ to 100 mA/cm$^2$; and
   d. recovering a product stream generated of a C2-8 alkane, $CO_2$ and $H_2$.

5. The process of claim 4, wherein the 2-5 carbon chain primary carboxylic acid is acetic acid and the C2-8 alkane is ethane.

6. The process of claim 4, wherein the process further comprises recovering the C2-8 alkane by a liquefaction comprising compressing a gas effluent.

* * * * *